US010067693B2

(12) United States Patent
Jesionowski et al.

(10) Patent No.: US 10,067,693 B2
(45) Date of Patent: *Sep. 4, 2018

(54) HIGHER AND LOWER AVAILABILITY PRIORITIZATION OF STORAGE CELLS IN AN AUTOMATED LIBRARY

(71) Applicant: International Business Machines Corporation, Armonk, NY (US)

(72) Inventors: Leonard G. Jesionowski, Tucson, AZ (US); Shawn M. Nave, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/697,294

(22) Filed: Sep. 6, 2017

(65) Prior Publication Data
US 2017/0364284 A1    Dec. 21, 2017

Related U.S. Application Data

(63) Continuation of application No. 14/683,077, filed on Apr. 9, 2015, now Pat. No. 9,792,055.

(51) Int. Cl.
*G06F 3/06* (2006.01)
(52) U.S. Cl.
CPC ............ *G06F 3/0617* (2013.01); *G06F 3/067* (2013.01); *G06F 3/0655* (2013.01); *G06F 3/0686* (2013.01)
(58) Field of Classification Search
CPC ........... G06F 12/0868; G06F 2212/213; G06F 2212/224; G06F 3/0686; G06F 3/0617; G06F 3/0655; G06F 3/067
See application file for complete search history.

(56) References Cited

U.S. PATENT DOCUMENTS

| 6,061,309 | A   |   | 5/2000 | Gallo et al. |
| 6,262,863 | B1  | * | 7/2001 | Ostwald ............ G11B 15/6835 360/92.1 |
| 7,505,224 | B2  |   | 3/2009 | Chamorro et al. |
| 8,135,494 | B2  |   | 3/2012 | Jesionowski et al. |

(Continued)

FOREIGN PATENT DOCUMENTS

EP    0910019 A2    4/1999

OTHER PUBLICATIONS

IBM, "IBM System Storage TS3500 Tape Library," International Business Machines Corporation, Information Page, 2008, 6 pages.
(Continued)

*Primary Examiner* — Hashem Farrokh
(74) *Attorney, Agent, or Firm* — Zilka-Kotab, P.C.

(57) ABSTRACT

A computer-implemented method, according to one embodiment, includes: designating a first set of drives as higher availability drives, designating a second set of drives as lower availability drives, and correlating a first cartridge with at least one of the higher availability drives and a second cartridge with at least one of the lower availability drives. Each of the drives is configured to receive and store cartridges via one or more accessors. Moreover, each of the one or more accessors is assigned a servicing location corresponding to the lower availability drives. Other systems, methods, and computer program products are described in additional embodiments.

20 Claims, 13 Drawing Sheets

(56) References Cited

U.S. PATENT DOCUMENTS

| | | |
|---|---|---|
| 9,792,055 B2 | 10/2017 | Jesionowski et al. |
| 2004/0153206 A1 | 8/2004 | Goodman et al. |
| 2010/0053803 A1* | 3/2010 | Jesionowski ........ G11B 15/682 360/91 |
| 2011/0122527 A1 | 5/2011 | Amir et al. |
| 2012/0204408 A1 | 8/2012 | Hartl et al. |
| 2013/0049554 A1 | 2/2013 | Todd |
| 2013/0311527 A1 | 11/2013 | Moody, II et al. |
| 2014/0146650 A1* | 5/2014 | Alber .................. G11B 27/002 369/53.41 |
| 2016/0299706 A1 | 10/2016 | Jesionowski et al. |

OTHER PUBLICATIONS

Lavenberg et al., "Regenerative Simulation of a Queuing Model of an Automated Tape Library," Automated Tape Library Simulation, Sep. 1975, pp. 463-475.
Jesionowski et al., U.S. Appl. No. 14/683,077, filed Apr. 9, 2015.
Non-Final Office Action from U.S. Appl. No. 14/683,077, dated Oct. 6, 2016.
Final Office Action from U.S. Appl. No. 14/683,077, dated Mar. 30, 2017.
Notice of Allowance from U.S. Appl. No. 14/683,077, dated Jun. 8, 2017.
List of IBM Patents or Patent Applications Treated as Related.
Jesionowski et al., U.S. Appl. No. 15/993,420, filed May 30, 2018.

\* cited by examiner

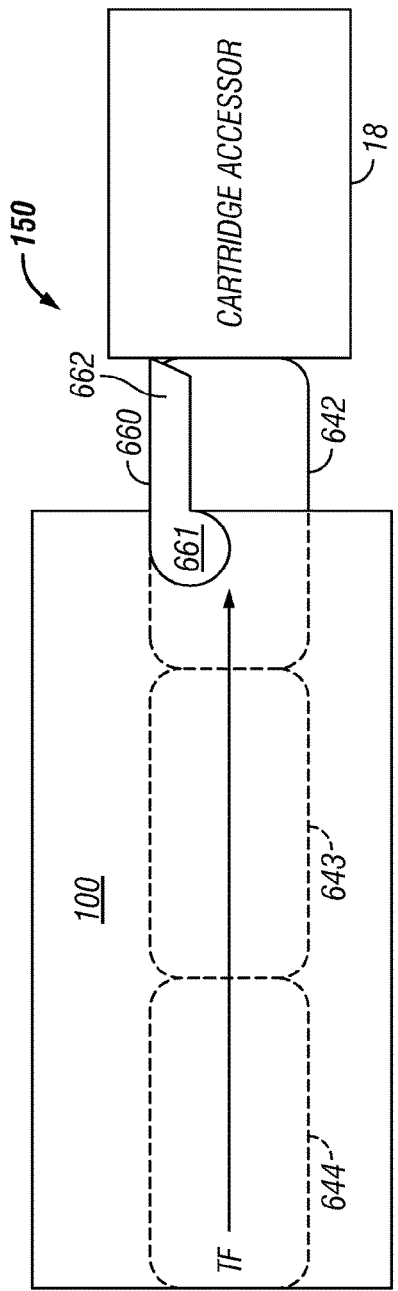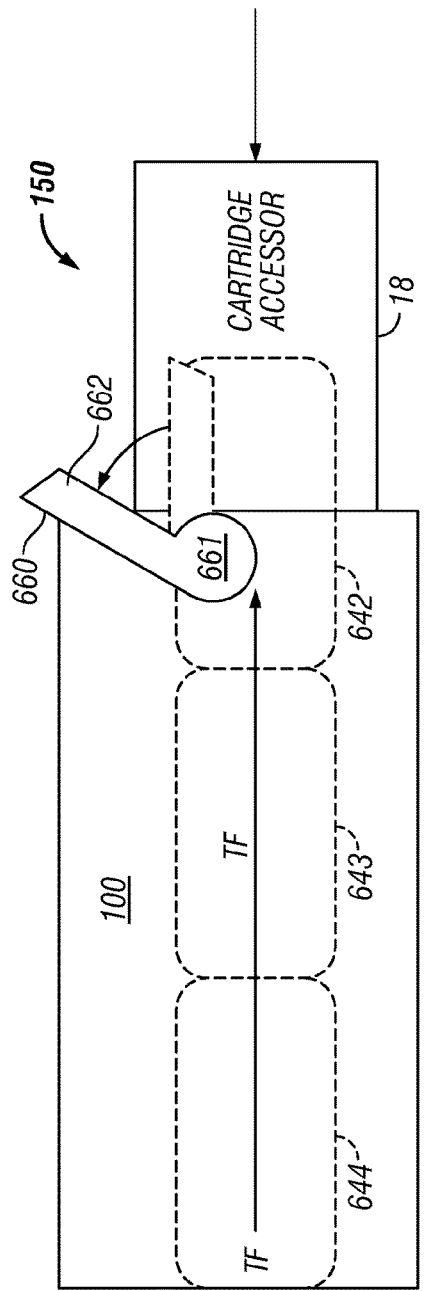

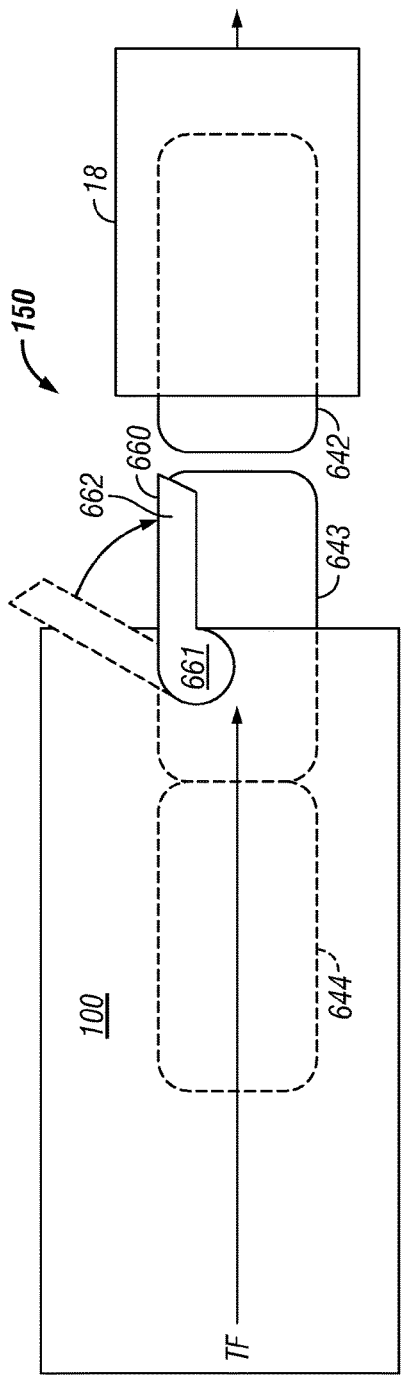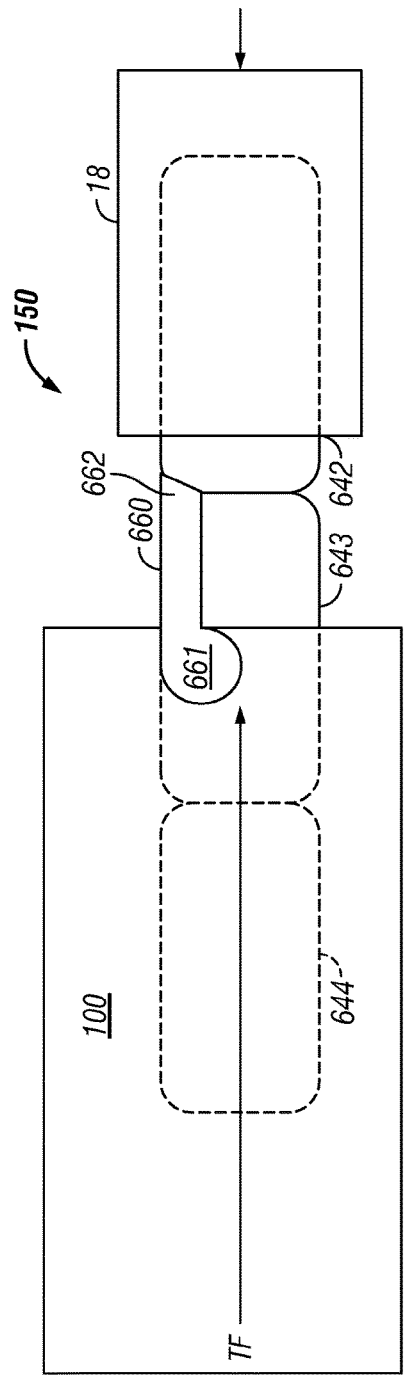
FIG. 8C
FIG. 8D

HIGHER AND LOWER AVAILABILITY PRIORITIZATION OF STORAGE CELLS IN AN AUTOMATED LIBRARY

BACKGROUND

The present invention relates to data storage systems, and more particularly, this invention relates to the prioritization of storage cells in an automated storage library.

Automated data storage libraries are known for providing cost effective storage and retrieval of large quantities of data. The data in automated data storage libraries is typically stored on media of data storage cartridges that are, in turn, stored at storage cells or the like inside the library in a fashion that renders the media, and its resident data, accessible for physical retrieval. Such data storage cartridges are commonly termed "removable media." Data storage cartridge media may comprise any type of media on which data may be stored and which may serve as removable media, including but not limited to magnetic media (such as magnetic tape or disks), optical media (such as optical tape or disks), electronic media (such as PROM, EEPROM, flash PROM, CompactFlash™, Smartmedia™, Memory Stick™, etc.), or other suitable media. An example of a data storage cartridge that is widely employed in automated data storage libraries for mass data storage is a magnetic tape cartridge.

In addition to data storage media, automated data storage libraries typically comprise data storage drives that store data to, and/or retrieve data from, the data storage cartridge media. Further, automated data storage libraries typically comprise I/O stations at which data storage cartridges are supplied or added to, or removed from, the library. The transport of data storage cartridges between data storage cells, data storage drives, and I/O stations is typically accomplished by one or more accessors. Such accessors have grippers for physically retrieving the selected data storage cartridges from the storage cells within the automated data storage library and transporting such cartridges to the data storage drives by moving, for example, in the X and Y directions.

BRIEF SUMMARY

A computer-implemented method, according to one embodiment, includes: designating a first set of drives as higher availability drives, designating a second set of drives as lower availability drives, and correlating a first cartridge with at least one of the higher availability drives and a second cartridge with at least one of the lower availability drives. Each of the drives is configured to receive and store cartridges via one or more accessors. Moreover, each of the one or more accessors is assigned a servicing location corresponding to the lower availability drives.

A computer program product, according to another embodiment, includes a computer readable storage medium having program instructions embodied therewith. The computer readable storage medium is not a transitory signal per se. Moreover, the program instructions executable by a controller to cause the controller to: designate, by the controller, a first set of drives as higher availability drives; designate, by the controller, a second set of drives as lower availability drives; and correlate, by the controller, a first cartridge with at least one of the higher availability drives and a second cartridge with at least one of the lower availability drives using at least one of a first procedure and a second procedure. Each of the drives is configured to receive and store cartridges via one or more accessors. Moreover, each of the one or more accessors is assigned a servicing location corresponding to at least some of the lower availability drives.

A computer-implemented method, according to yet another embodiment, includes: designating a first set of drives as higher availability drives, designating a second set of drives as lower availability drives, defining a first logical library to which at least one of the higher availability drives is allocated, defining a second logical library to which at least one of the lower availability drives is allocated, assigning a first cartridge to the first logical library, and assigning a second cartridge to the second logical library.

Any of these embodiments may be implemented in a magnetic data storage system such as a data storage library.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIGS. 8A-8D are partial side views of a cartridge blocking mechanism according to one embodiment.

DETAILED DESCRIPTION

Figure 1:
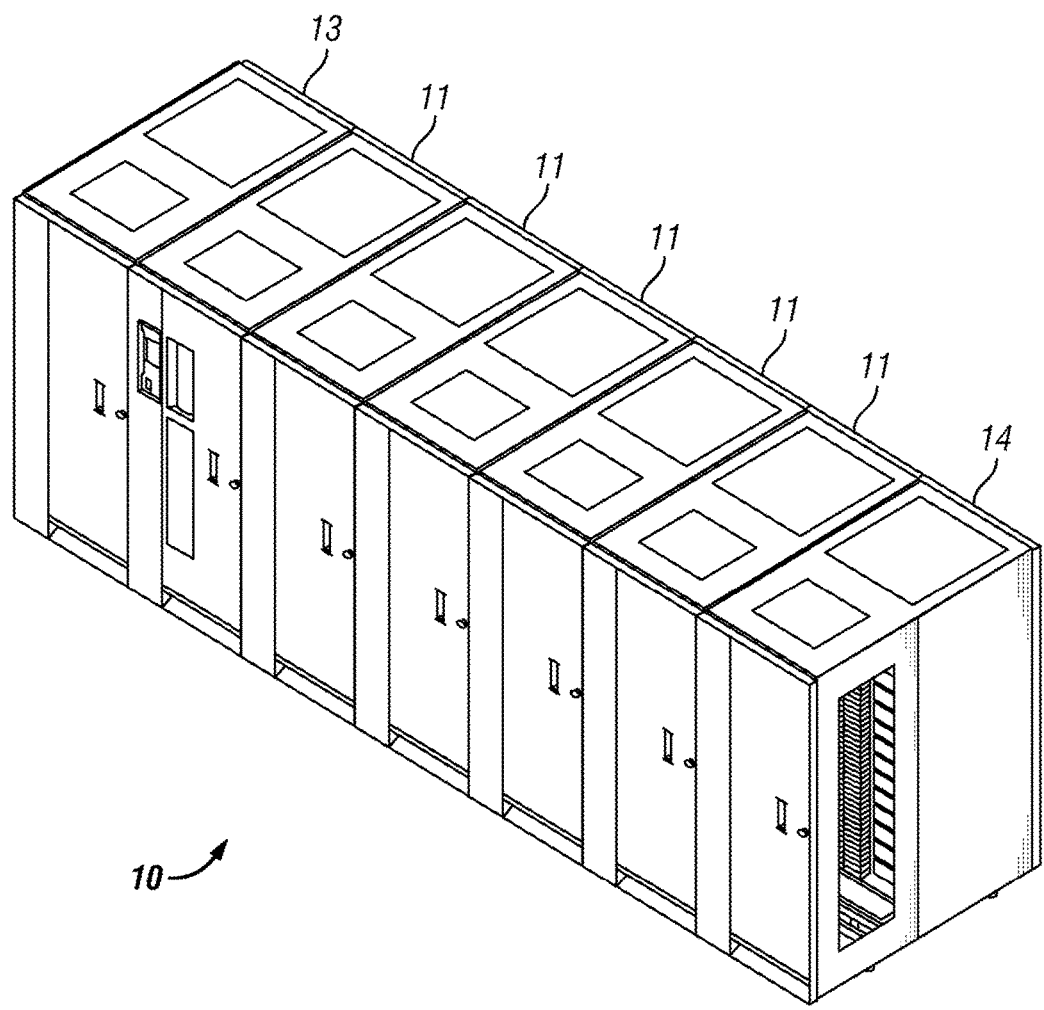
FIG. 1 is a perspective view of an automated data storage library according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of data storage systems, as well as operation and/or component parts thereof.

In one general embodiment, a method of operationally prioritizing the hierarchy of storage areas of an automated library having a plurality of storage cells includes designating a first set of storage cells as higher availability cells; and designating a second set of storage cells as lower availability cells. Each of the storage cells is configured to receive and store cartridges via one or more accessors. Each of the one or more accessors is assigned a servicing location corresponding to the lower availability cells. The method also includes correlating a first cartridge with at least one of the higher availability cells and a second cartridge with at least one of the lower availability cells. The correlating includes: assessing previous usage of a cartridge, and determining whether the cartridge should be assigned to one of the higher availability cells or one of the lower availability cells based on the assessing.

In another general embodiment, a computer program product for operationally prioritizing the hierarchy of storage areas of an automated library having a plurality of storage cells includes a computer readable storage medium having program instructions embodied therewith, the program instructions executable by a controller to cause the controller to: designate, by the controller, a first set of storage cells as higher availability cells; and designate, by the controller, a second set of storage cells as lower availability cells. Each of the storage cells is configured to receive and store cartridges via one or more accessors. Each of the one or more accessors is assigned a servicing location corresponding to at least some of the lower availability cells. Additional program instructions are executable by the controller to cause the controller to correlate, by the controller, a first cartridge with at least one of the higher availability cells and a second cartridge with at least one of the lower availability cells using at least one of a first procedure and a second procedure. The first procedure includes: assigning the first cartridge to a first logical library to which at least one of the higher availability cells may be allocated, and assigning the second cartridge to a second logical library to which at least one of the lower availability cells may be allocated. The second procedure includes: assessing previous usage of each cartridge, and determining whether the cartridge should be assigned to one of the higher availability cells or one of the lower availability cells based on the assessing.

In yet another general embodiment, a method of operationally prioritizing the hierarchy of storage areas of an automated library having a plurality of storage cells includes designating a first set of storage cells as higher availability cells, and designating a second set of storage cells as lower availability cells. Each of the storage cells is configured to receive and store one or more cartridges via one or more accessors. Each of the one or more accessors is assigned a servicing location corresponding to at least some of the lower availability cells. A first logical library is defined, to which at least one of the higher availability cells may be allocated. A second logical library is defined, to which at least one of the lower availability cells may be allocated. A first cartridge is assigned to the first logical library. A second cartridge is assigned to the second logical library.

Figure 2:
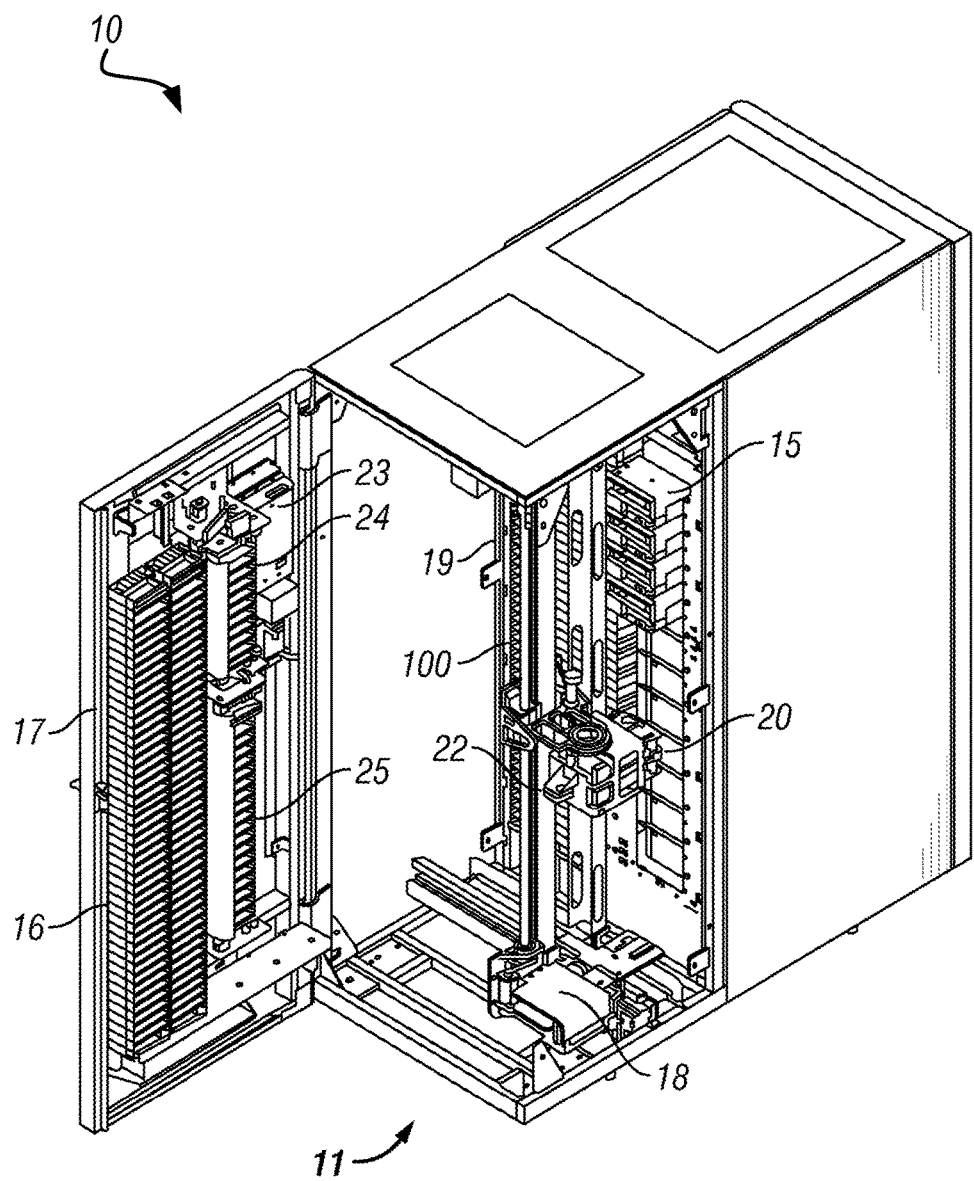
FIG. 2 is a perspective view of a storage frame from the data storage library of FIG. 1.

FIGS. 1-2 illustrate an automated data storage library 10 which stores and retrieves data storage cartridges, containing data storage media (not shown), from multi-cartridge deep slot cells 100 and single cartridge storage cells 16. An example of an automated data storage library which has a similar configuration as that depicted in FIGS. 1-2, and may be implemented with some of the various approaches herein is the IBM TS3500 Tape Library. Moreover, it should be noted that references to "data storage media" herein refer to data storage cartridges, and for purposes of the present application, the two terms may be used synonymously.

The library 10 of FIG. 1 comprises a left hand service bay 13, one or more storage frames 11, and right hand service bay 14. As will be discussed in further detail below, a frame may comprise an expansion component of the library. Thus, storage frames may be added or removed to expand or reduce the size and/or functionality of the library. According to different approaches, frames may include additional storage cells, deep slot cells, drives, import/export stations, accessors, operator panels, etc.

FIG. 2 shows an exemplary embodiment of a storage frame 11, which acts as the base frame of the library 10. Moreover, the storage frame 11 illustrated in FIG. 2 is contemplated to be a minimum configuration of the library 10, for which there is only a single accessor 18 (i.e., there are no redundant accessors) and no service bay. However, in other embodiments, a storage frame may include multiple robotic accessors and/or service bays.

Looking to FIG. 2, the library 10 is arranged for accessing data storage media in response to commands from at least one external host system (not shown). The library 10 includes a plurality of storage cells 16 on front wall 17 and a plurality of multi-cartridge deep slot cells 100 on rear wall 19, both of which may be used to storing data storage cartridges that may contain data storage media. According to one approach, the storage cells 16 are configured to store a single data storage cartridge, and the multi-cartridge deep slot cells 100 are configured to store a plurality of data storage cartridges. In a preferred approach, the multi-cartridge deep slot cells may be arranged in sequential order of tiers from front to rear (e.g., see FIG. 7A).

With continued reference to FIG. 2, the storage frame 11 of the library 10 also includes at least one data storage drive 15, e.g., for reading and/or writing data with respect to the data storage media. Additionally, a first accessor 18 may be used to transport data storage media between the plurality of storage cells 16, the multi-cartridge deep slot cells, and/or the data storage drive(s) 15. According to various approaches, the data storage drives 15 may be optical disk drives, magnetic tape drives, or other types of data storage drives as are used to read and/or write data with respect to the data storage media.

As illustrated, the storage frame 11 may optionally include an operator panel 23 or other user interface, such as a web-based interface, which allows a user to interact with the library 10. The storage frame 11 may also optionally comprise an upper I/O station 24 and/or a lower I/O station 25, thereby allowing data storage cartridges to be added (e.g., inserted) to the library inventory and/or removed from the library without disrupting library operation. Furthermore, the library 10 may have one or more storage frames 11, each having storage cells 16, preferably accessible by the first accessor 18.

As described above, the storage frames 11 may be configured with different components depending upon the intended function. One configuration of storage frame 11 may comprise storage cells 16 and/or multi-cartridge deep slot cells 100, data storage drive(s) 15, and other optional components to store and retrieve data from the data storage cartridges. However, in another approach, a storage frame 11 may include storage cells 16 and/or multi-cartridge deep slot cells 100 and no other components. The first accessor 18 may have a gripper assembly 20, e.g., for gripping one or more data storage media, in addition to having a bar code scanner 22 or other reading system, such as a cartridge memory reader or similar system mounted on the gripper assembly 20, to "read" identifying information about the data storage media.

Figure 3:
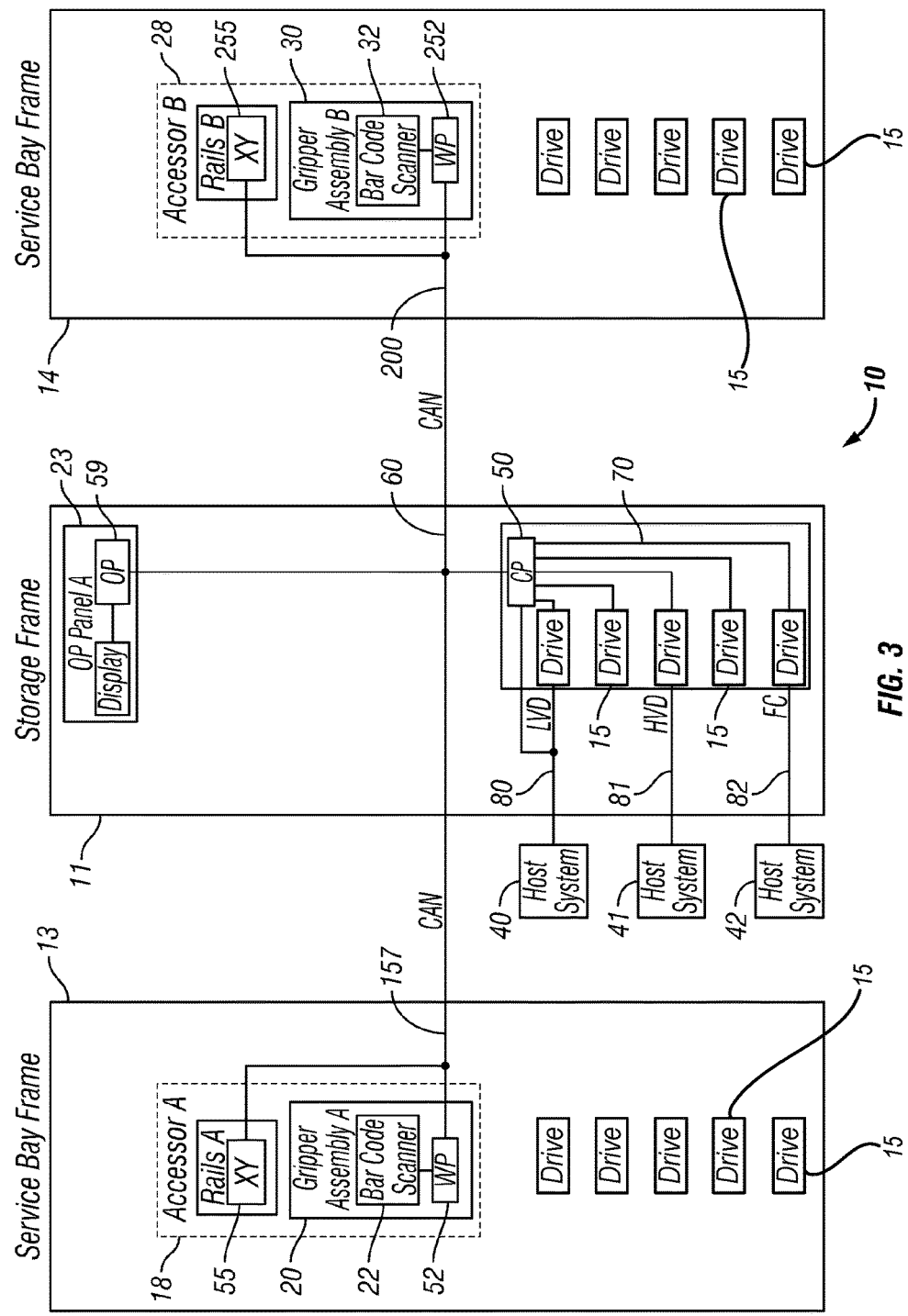
FIG. 3 is a block diagram of an automated data storage library according to one embodiment.

FIG. 3 depicts an automated data storage library 10, in accordance with one embodiment. As an option, the present automated data storage library 10 may be implemented in conjunction with features from any other embodiment listed herein, such as those described with reference to the other FIGS. Of course, however, such automated data storage library 10 and others presented herein may be used in various applications and/or in permutations which may or may not be specifically described in the illustrative embodiments listed herein. Further, the automated data storage library 10 presented herein may be used in any desired environment. Thus FIG. 3 (and the other FIGS.) should be deemed to include any and all possible permutations Referring now to FIG. 3, the automated data storage library 10 as described in reference to FIGS. 1 and 2, is depicted according to one embodiment. According to a preferred approach, the library 10 may employ a controller, e.g., arranged as a distributed system of modules with a plurality of processor nodes.

In one approach, the library is controlled, not by a central controller, but rather, by a distributed control system for receiving logical commands and converting the commands to physical movements of the accessor and gripper, and for operating the drives in accordance with the desired physical movements. The distributed control system may also provide logistical support, such as responding to host requests for element status, inventory, library status, etc. The specific commands, the conversion of those commands to physical movements, and the operation of the drives may be of a type known to those of skill in the art.

While the automated data storage library 10 has been described as employing a distributed control system, various other approaches described and/or suggested herein may be implemented in automated data storage libraries regardless of control configuration, such as, but not limited to, an automated data storage library having one or more library controllers that are not distributed.

Referring still to FIG. 3, the library 10 may have one or more storage frames 11, a left hand service bay 13 and a right hand service bay 14. The left hand service bay 13 is shown with a first accessor 18, where, as discussed above, the first accessor 18 may include a gripper assembly 20 and/or a reading system 22 to "read" identifying information about the data storage media depending on the desired embodiment. Furthermore, the right hand service bay 14 is shown having a second accessor 28, which includes a gripper assembly 30 and may also include a reading system 32 to "read" identifying information about the data storage media.

According to one approach, in the event of a failure or other unavailability of the first accessor 18, or its gripper assembly 20, etc., the second accessor 28 may perform some or all of the functions of the first accessor 18. Thus in different approaches, the two accessors 18, 28 may share one or more mechanical paths, they may have completely independent mechanical paths, or combinations thereof. In one example, the accessors 18, 28 may have a common horizontal rail with independent vertical rails to travel therealong. Moreover, it should be noted that the first and second accessors 18, 28 are described as first and second for descriptive purposes only and this description is not meant to limit either accessor to an association with either the left hand service bay 13, or the right hand service bay 14.

In an exemplary embodiment which is in no way intended to limit the invention, the first and second accessors 18, 28 may preferably move their grippers in at least two directions, called the horizontal "X" direction and vertical "Y" direction, e.g., to retrieve and grip, deliver and release, load and unload, etc. the data storage cartridge at the storage cells 16, multi-cartridge deep slot cells 100, data storage drives 15, etc.

With continued reference to FIG. 3, library 10 receives commands from one or more host systems 40, 41, 42. The host systems 40, 41, 42, such as host servers, communicate with the library directly, e.g., on path 80, through one or more control ports (not shown), or through one or more data storage drives 15 on paths 81, 82. Thus, in different approaches, the host systems 40, 41, 42 may provide commands to access particular data storage cartridges and move the cartridges, for example, between the storage cells 16 and the data storage drives 15. The commands are typically logical commands identifying the cartridges or cartridge media, and/or logical locations for accessing the media. Furthermore, it should be noted that the terms "commands" and "work requests" are used interchangeably herein to refer to such communications from the host system 40, 41, 42 to the library 10 as are intended to result in accessing particular data storage media within the library 10 depending on the desired approach.

According to one embodiment, the library 10 may be controlled by a library controller. Moreover, in various approaches, the library controller may include a distributed control system receiving the logical commands from hosts, determining the required actions, and/or converting the actions to physical movements of the first and/or second accessor 18, 28. In another approach, the distributed control system may have a plurality of processor nodes, each having one or more computer processors. According to one example of a distributed control system, a communication processor node 50 may be located in a storage frame 11. The communication processor node provides a communication link for receiving the host commands, either directly or through the drives 15, via at least one external interface, e.g., coupled to line 80.

Still referring to FIG. 3, the communication processor node 50 may additionally provide a communication link 70 for communicating with the data storage drives 15. As illustrated, the communication processor node 50 may preferably be located in the storage frame 11, e.g., close to the data storage drives 15. Furthermore, one or more additional work processor nodes may be provided to form an exemplary distributed processor system, which may comprise, e.g., a work processor node 52 located at first accessor 18, and that is coupled to the communication processor node 50 via a network 60, 157. According to different approaches, each work processor node may respond to received commands that are broadcast thereto from any communication processor node, and the work processor nodes may also direct the operation of the accessors, e.g., providing move commands. An XY processor node 55 may be provided and may be located at an XY system of first accessor 18. As illustrated, the XY processor node 55 is coupled to the network 60, 157, and is responsive to the move commands, operating the XY system to position the gripper assembly 20.

Also, an operator panel processor node 59 may be provided at the optional operator panel 23 for providing an interface for communicating between the operator panel and the communication processor node 50, the work processor nodes 52, 252, and the XY processor nodes 55, 255.

A network 60, for example comprising a common bus, is provided, coupling the various processor nodes. The network may comprise a robust wiring network, such as the commercially available Controller Area Network (CAN) bus system, which is a multi-drop network, having a standard access protocol and wiring standards, for example, as defined by CiA, the CAN in Automation Association, Am Weich Selgarten 26, D-91058 Erlangen, Germany. Other networks, such as Ethernet, or a wireless network system, such as RF or infrared, may be employed in the library as is known to those of skill in the art. In addition, multiple independent networks may also be used to couple the various processor nodes.

As illustrated in FIG. 3, the communication processor node 50 is coupled to each of the data storage drives 15 of a storage frame 11, via lines 70, and are thereby communicating with the drives 15 and with host systems 40, 41, 42. Alternatively, the host systems 40, 41, 42 may be directly coupled to the communication processor node 50, at input 80 for example, or to control port devices (not shown) which connect the library to the host system(s) with a library interface similar to the drive/library interface. As is known to those of skill in the art, various communication arrangements may be employed for communication with the hosts and with the data storage drives. In the example of FIG. 3, host connections 80 and 81 are intended to be SCSI busses. However, bus 82 comprises an example of a Fibre Channel bus which is a high speed serial data interface, allowing transmission over greater distances than the SCSI bus systems.

According to some approaches, the data storage drives 15 may be in close proximity to the communication processor node 50, and may employ a short distance communication scheme, such as SCSI, or a serial connection, such as RS-422. Thus the data storage drives 15 may be individually coupled to the communication processor node 50 by means of lines 70. Alternatively, the data storage drives 15 may be coupled to the communication processor node 50 through one or more networks, such as a common bus network.

Furthermore, additional storage frames 11 may be provided, whereby each is preferably coupled to the adjacent storage frame. According to various approaches, any of the additional storage frames 11 may include communication processor nodes 50, storage cells 16, data storage drives 15, networks 60, etc.

Moreover, as described above, the automated data storage library 10 may comprise a plurality of accessors. A second accessor 28, for example, is shown in a right hand service bay 14 of FIG. 3. The second accessor 28 may include a gripper assembly 30 for accessing the data storage media, and an XY system 255 for moving the second accessor 28. The second accessor 28 may run on the same horizontal mechanical path as the first accessor 18, and/or on an adjacent (e.g., separate) path. Moreover the illustrative control system additionally includes an extension network 200 which forms a network coupled to network 60 of the storage frame(s) 11 and to network 157 of left hand service bay 13.

In FIG. 3 and the accompanying description, the first and second accessors are associated with the left hand service bay 13 and the right hand service bay 14 respectively. However, this is for illustrative purposes and there may not be an actual association. Thus, according to another approach, network 157 may not be associated with the left hand service bay 13 and network 200 may not be associated with the right hand service bay 14. Moreover, depending on the design of the library, it may not be necessary to have a left hand service bay 13 and/or a right hand service bay 14 at all.

An automated data storage library 10 typically comprises one or more controllers to direct the operation of the automated data storage library. Moreover, host computers and data storage drives typically include similar controllers. A library controller may take many different forms and may comprise, for example, but is not limited to, an embedded system, a distributed control system, a personal computer, a workstation, etc. The term "library controller" as used herein is intended in its broadest sense as a device that includes at least one processor, and optionally further circuitry and/or logic, for controlling and/or providing at least some aspects of library operations.

Figure 4:
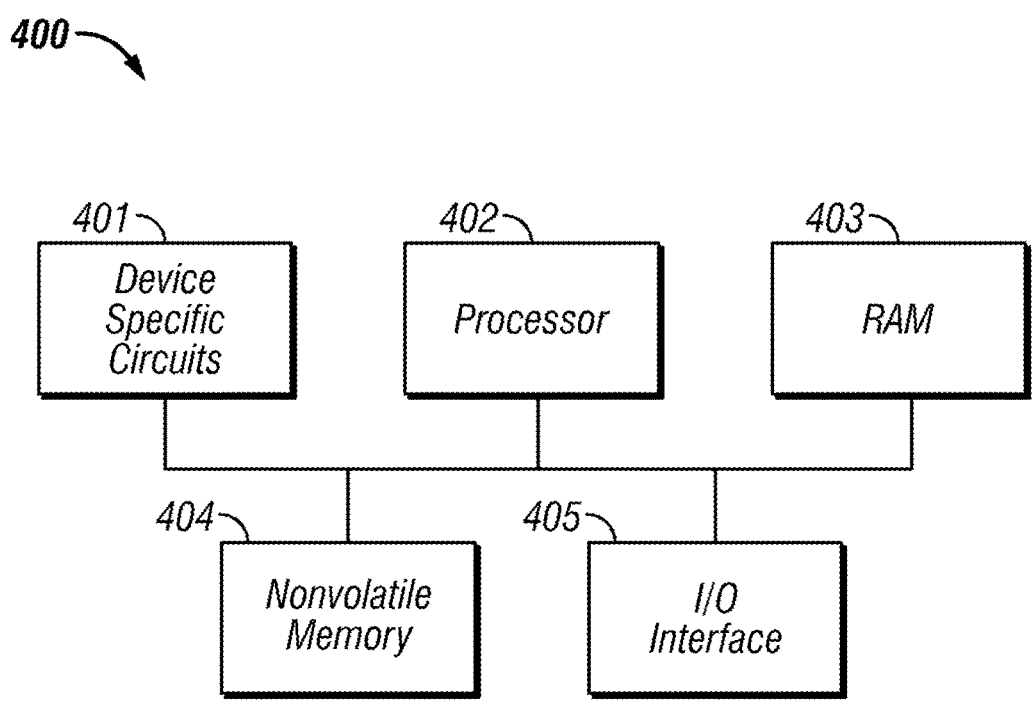
FIG. 4 is a block diagram depicting a controller configuration according to one embodiment.

Referring now to FIG. 4, a typical controller 400 is shown with a processor 402, Random Access Memory (RAM) 403, nonvolatile memory 404, device specific circuits 401, and I/O interface 405. Alternatively, the RAM 403 and/or nonvolatile memory 404 may be contained in the processor 402 as could the device specific circuits 401 and I/O interface 405. The processor 402 may comprise, for example, an off-the-shelf microprocessor, custom processor, Field Programmable Gate Array (FPGA), Application Specific Integrated Circuit (ASIC), discrete logic, etc. The RAM 403 is typically used to hold variable data, stack data, executable instructions, etc.

According to various approaches, the nonvolatile memory 404 may comprise any type of nonvolatile memory such as, but not limited to, Electrically Erasable Programmable Read Only Memory (EEPROM), flash Programmable Read Only Memory (PROM), battery backup RAM, hard disk drives, etc. However, the nonvolatile memory 404 is typically used to hold the executable firmware and any nonvolatile data. Moreover, the I/O interface 405 comprises a communication interface that allows the processor 402 to communicate with devices external to the controller. Examples may comprise, but are not limited to, serial interfaces such as RS-232, USB (Universal Serial Bus) or Small Computer Systems Interface (SCSI). The device specific circuits 401 provide additional hardware to enable the controller 400 to perform unique functions including, but not limited to, motor control of a cartridge gripper. Moreover, the device specific circuits 401 may include electronics that provide, by way of example but not limitation, Pulse Width Modulation (PWM) control, Analog to Digital Conversion (ADC), Digital to Analog Conversion (DAC), etc. In addition, all or part of the device specific circuits 401 may reside outside the controller 400.

While the automated data storage library 10 is described as employing a distributed control system, the various approaches described and/or suggested herein may be implemented in various automated data storage libraries regardless of control configuration, including, but not limited to, an automated data storage library having one or more library controllers that are not distributed. Moreover, a library controller may comprise one or more dedicated controllers of a library, depending on the desired embodiment. For example, there may be a primary controller and a backup controller. In addition, a library controller may comprise one or more processor nodes of a distributed control system. According to one example, communication processor node 50 (e.g., of FIG. 3) may comprise the library controller while the other processor nodes (if present) may assist the library controller and/or may provide backup or redundant functionality. In another example, communication processor node 50 and work processor node 52 may work cooperatively to form the library controller while the other processor nodes (if present) may assist the library controller and/or may provide backup or redundant functionality. Still further, all of the processor nodes may comprise the library controller. According to various approaches described and/or suggested herein, a library controller may have a single processor or controller, or it may include multiple processors or controllers.

Figure 5A:
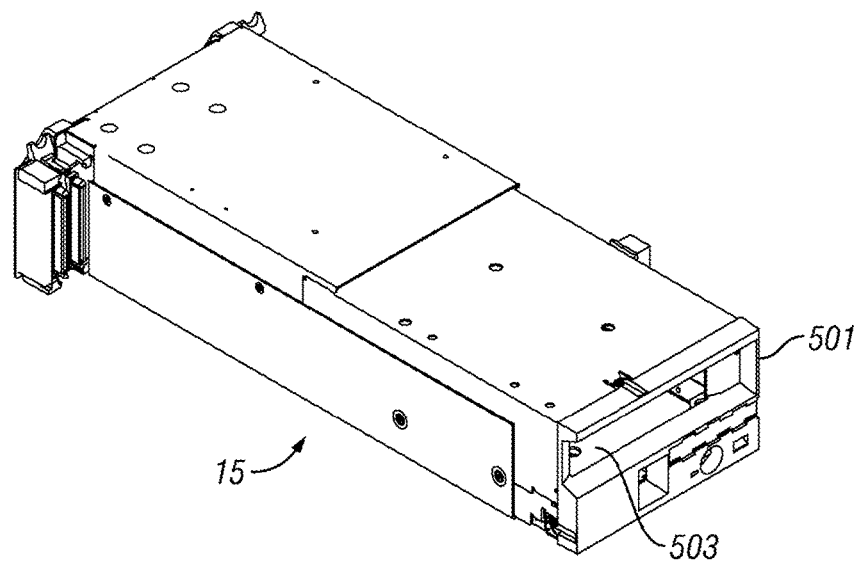
FIG. 5A is a frontal perspective view of a data storage drive according to one embodiment.
Figure 5B:
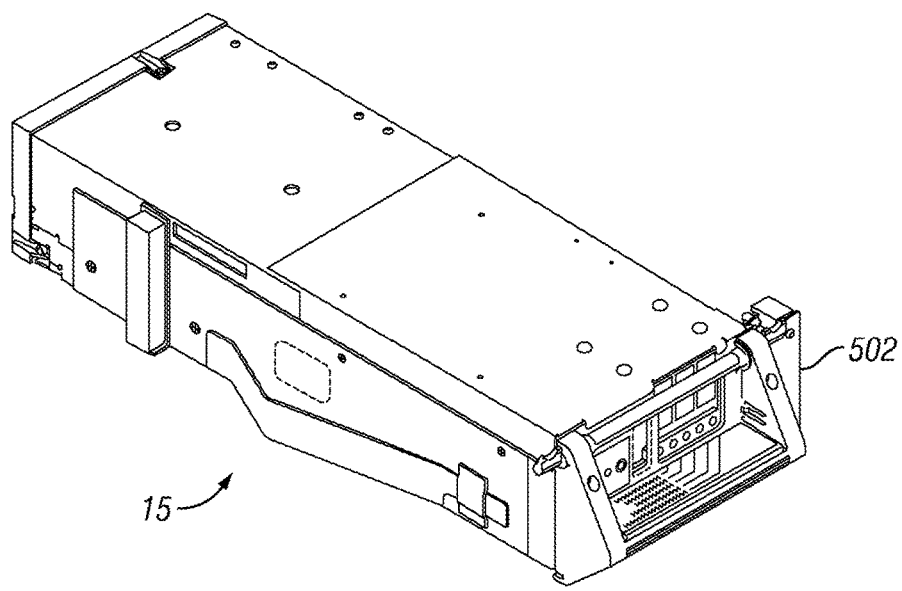
FIG. 5B is a rear perspective view of the data storage drive of FIG. 5A.

FIGS. 5A-5B illustrate the front 501 and rear 502 views of a data storage drive 15, according to one embodiment. In the example depicted in FIGS. 5A-5B, the data storage drive 15 comprises a hot-swap drive canister, which is in no way intended to limit the invention. In fact, any configuration of data storage drive may be used whether or not it includes a hot-swap canister. As discussed above, a data storage drive 15 is used to read and/or write data with respect to the data storage media, and may additionally communicate with a memory which is separate from the media, and is located within the cartridge. Thus, according to one approach, a data storage cartridge may be placed into the data storage drive 15 at opening 503.

Figure 6:
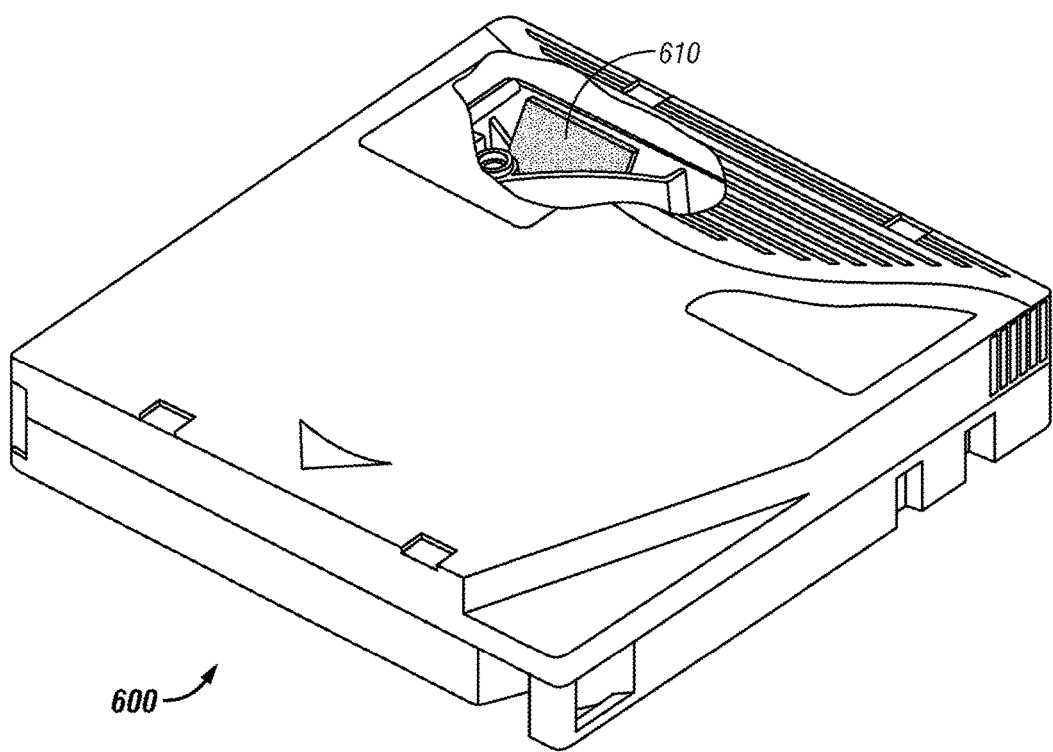
FIG. 6 is perspective view of a data storage cartridge having a cutaway portion, according to one embodiment.

Furthermore, FIG. 6 illustrates an embodiment of a data storage cartridge 600 with a cartridge memory 610 shown in a cutaway portion of the Figure, which is in no way intended to limit the invention. In fact, any configuration of data storage cartridge may be used whether or not it comprises a cartridge memory. According to various approaches, media of the data storage cartridge media may include any type of media on which data may be stored, including but not limited to magnetic media, e.g., magnetic tape, disks, etc.; optical media, e.g., optical tape, disks, etc.; electronic media, e.g., PROM, EEPROM, flash PROM, CompactFlash™, Smartmedia™, Memory Stick™, etc.; etc., or other suitable media. Moreover, an example of a data storage cartridge that is widely employed in automated data storage libraries for mass data storage is a magnetic tape cartridge in which the media is magnetic tape.

Figure 7A:
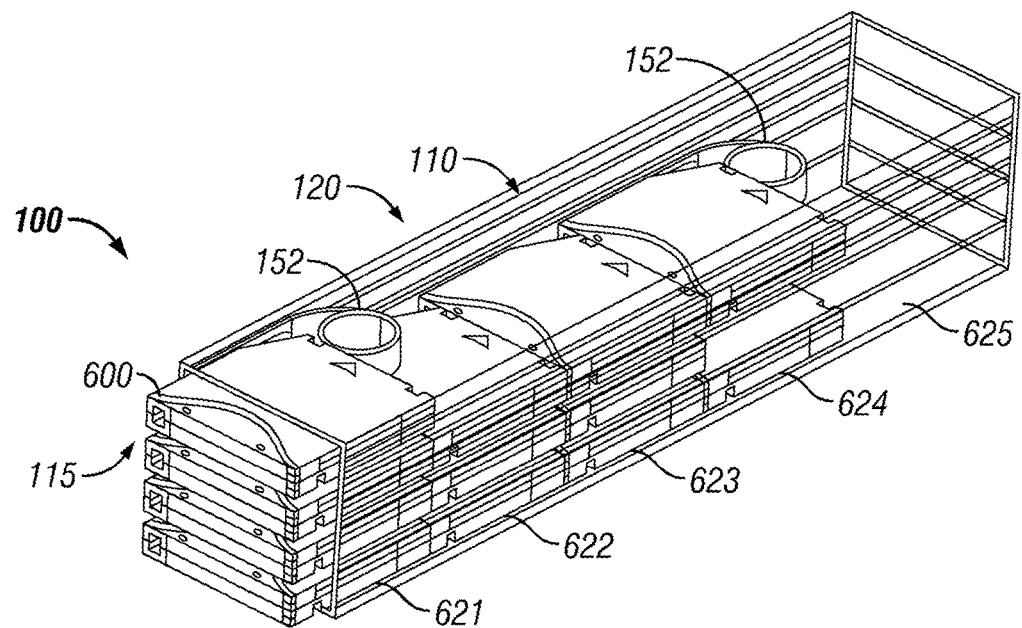
FIGS. 7A-7B are perspective views of a multi-cartridge deep slot cell according to one embodiment.
Figure 7B:
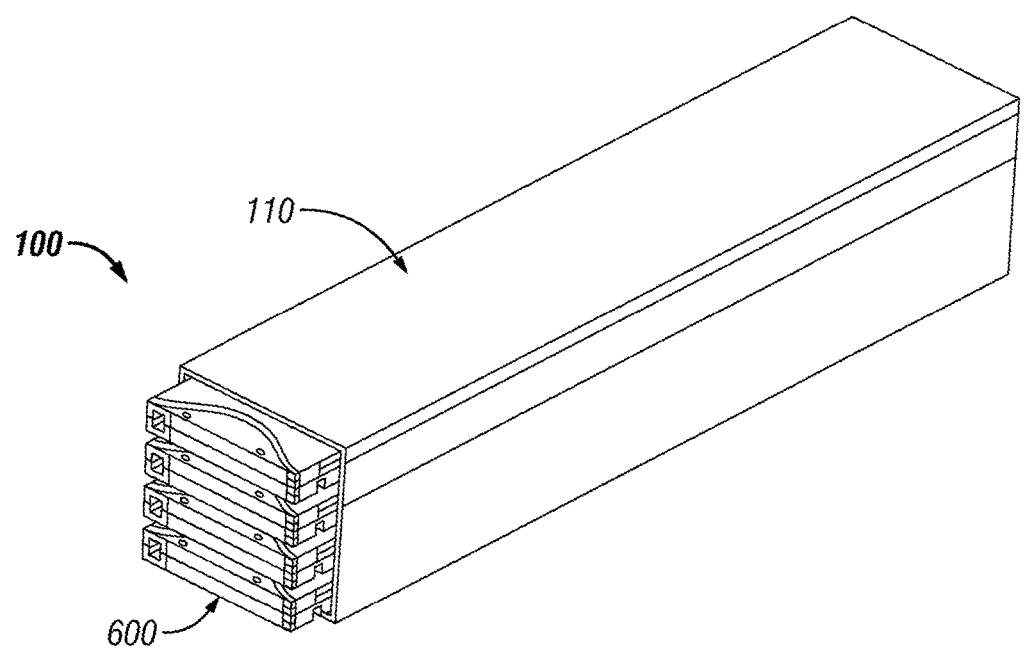

Looking now to FIGS. 7A-7B, a multi-cartridge deep slot cell 100 having biasing springs 152 is depicted according to one embodiment. As shown in the illustrative embodiment, the multi-cartridge deep slot cell 100 comprises a housing 110 defining an interior space 115. Furthermore, a plurality of storage cells 120 is disposed within the housing, and may be configured for storing up to a plurality of data storage cartridges 600, depending on the desired approach. Alternatively, the multi-cartridge deep slot cell 100 may be built into the frame of the automated data storage library according to one approach.

FIGS. 8A-8D illustrate an embodiment of a cartridge blocking mechanism 150 having a retaining gate 660 that retains the data storage cartridges in the multi-cartridge deep slot cell 100 according to one embodiment. As illustrated, according to one approach, the retaining gate 660 may be externally attached to a multi-cartridge deep slot cell 100, relative to a front opening of the multi-cartridge deep slot cell 100, whereby the retaining gate 660 can be activated by an accessor 18, e.g., of an automated tape library. Moreover, the retaining gate 660 allows for positive cartridge retention against the pressure of biasing springs (see 152 of FIGS. 7A-7B), and ensures that one or more data storage cartridges do not get pushed out of the multi-cartridge deep slot cell 100 simultaneously, while allowing the pushing mechanism (not shown) of the multi-cartridge deep slot cell 100 to continuously push data storage cartridge(s) to the opening in a multi-cartridge deep slot cell 100. Thus, according to one approach, the accessor 18 may open the retaining gate to gain access to the data storage cartridge in tier 1 and, upon its extraction, the biasing spring 152 moves the cartridge(s) positioned behind the extracted cartridge forward, thereby promoting the cartridge(s) by one tier as will soon become apparent.

The basic working of the retaining gate is that the gate prevents the data storage cartridge(s) from being pushed out of a multi-cartridge deep slot cell 100. For example, as shown in FIGS. 8A-8D, a retaining gate 660 can be lifted by, for example, accessor 18 or by a front storage cartridge 642 for cartridge removal from/insertion into a multi-cartridge deep slot cell 100. Specifically, retaining gate 660 has a pivoting arm 661 mounted on multi-cartridge deep slot cell 100 via a pivoting post (not shown) that can be integral to a construction of multi-cartridge deep slot cell 100. Pivoting arm 661 is located below a catch 662 of retaining gate 660 whereby a thrust force TF through data storage cartridge 644-642 caused by the pushing mechanism (not shown) of multi-cartridge deep slot cell 100 causes retaining gate 660 to stay closed in a retaining position as shown in FIG. 8A. Moreover, the retaining gate 660 is preferably biased such that it closes in the downward direction over the front opening of multi-cartridge deep slot cell 100. This constant biasing may be achieved via gravity as shown in FIG. 8A or by implementing a spring force, e.g., attached to retaining gate 660 (not shown).

For removal of front storage cartridge 642 by accessor 18 from multi-cartridge deep slot cell 100, retaining gate 660 must be lifted upward to a releasing position whereby catch 662 of retaining gate 660 is disengaged from front storage cartridge 642. This can be seen in FIG. 8B where accessor 18 interfaces with retaining gate 660 by providing a lifting force. Once retaining gate 660 is lifted to the releasing position and accessor 18 is engaged with storage cartridge 642, accessor 18 can pull storage cartridge 642 out of multi-cartridge deep slot cell 100 and into accessor 18 without any interference of retaining gate 660 as shown in FIG. 8C. In view of storage cartridges 644 and 643 being stored in multi-cartridge deep slot cell 100, retaining gate 660 must return to its retaining position to prevent storage cartridges 644 and 643 from being ejected from multi-cartridge deep slot cell 100 by the thrust force TF of the pushing mechanism (not shown). During extraction of front storage cartridge 642 through the front opening of multi-cartridge deep slot cell 100, the retaining gate 660, which is being biased downward, moves back to the retaining position to engage storage cartridge 643.

Once front storage cartridge 642 is extracted and storage cartridges 643 and 644 are retained from being pushed out of multi-cartridge deep slot cell 100, retaining gate 660 has successfully completed its cartridge retrieval process. Now retaining gate 660 demonstrates its ability to work for cartridge insertion into multi-cartridge deep slot cell 100. When accessor 18 begins to insert storage cartridge 642 back into multi-cartridge deep slot cell 100, retaining gate 660 is lifted to its releasing position to allow storage cartridge 642 through the front opening of multi-cartridge deep slot cell 100. Catch 662 of retaining gate 660 interfaces with a rear portion of storage cartridge 642, in particular a beveled surface of catch 662 as shown in FIG. 8D, whereby retaining gate 660 is lifted to its releasing position as shown in FIG. 8B due to storage cartridge 642 being pushed in multi-cartridge deep slot cell 100 by accessor 18. In doing so, storage cartridges 644, 643 are pushed deeper into multi-cartridge deep slot cell 100 by storage cartridge 642 in multi-cartridge deep slot cell 100 by accessor 18. Thus, the accessor is able to provide a force greater than the thrust force TF antiparallel thereto, to overcome the directional biasing of the storage cartridges 644, 643. Upon full insertion into multi-cartridge deep slot cell 100, retaining gate 660 moves to its retaining position to engage storage cartridge 642 as shown in FIG. 8A.

Thus, looking to various embodiments presented herein, access to a storage cell may include the ability to remove a cartridge from a storage cell, the ability to place a cartridge into a storage cell, or combinations thereof.

According to an exemplary embodiment, the storage cells from top to bottom are considered to be in parallel and comprise the same tier. Moreover, the storage cells from front to back, in a particular row, are considered to be in series and comprise sequential tiers.

Referring back to FIGS. 7A-7B, in accordance with one embodiment, storage cells 120 are depicted as being configured for storing up to a plurality of data storage cartridges 600, and arranged in sequential order of tiers 621, 622, 623, 624, 625 from front to rear. It should be noted that the frontmost tier 621 is also called "tier 1", while the next tier 622 is called "tier 2", etc., and the last tier 625 is also called the "rearmost" tier. However, referring to FIG. 2, in one embodiment, the single cartridge storage cells 16 are also termed "tier 0".

Referring again to FIGS. 1-3, according to one embodiment, the controller of automated data storage library 10 may operate the accessor(s) 18, 28 to selectively extract, place and/or transport data storage cartridges with respect to the multi-cartridge deep slot cells 100 and/or other elements of the automated data storage library 10. For example, the controller may facilitate extracting a cartridge from a multi-cartridge deep slot cell 100, transporting the cartridge to a data storage drive 15 and placing the cartridge in the drive 15. The controller may then extract the cartridge from the data storage drive 15, while directing the accessor to transport the cartridge to a specific multi-cartridge deep slot cell 100, and place the cartridge therein.

In one embodiment, one or more data storage cartridges may be added into the library, e.g., at an I/O station 24, 25, whereby the controller of the automated data storage library 10 may then operate the accessor(s) 18, 28 to transport the cartridge(s) to specific multi-cartridge deep slot cell(s) 100, and place the cartridge(s) therein. Similarly, the controller may operate the accessor(s) to selectively extract, place and transport data storage cartridges with respect to the single cartridge storage cells 16, and/or transport inserted or added cartridge(s) to specific single cartridge storage cells 16.

Figure 9:
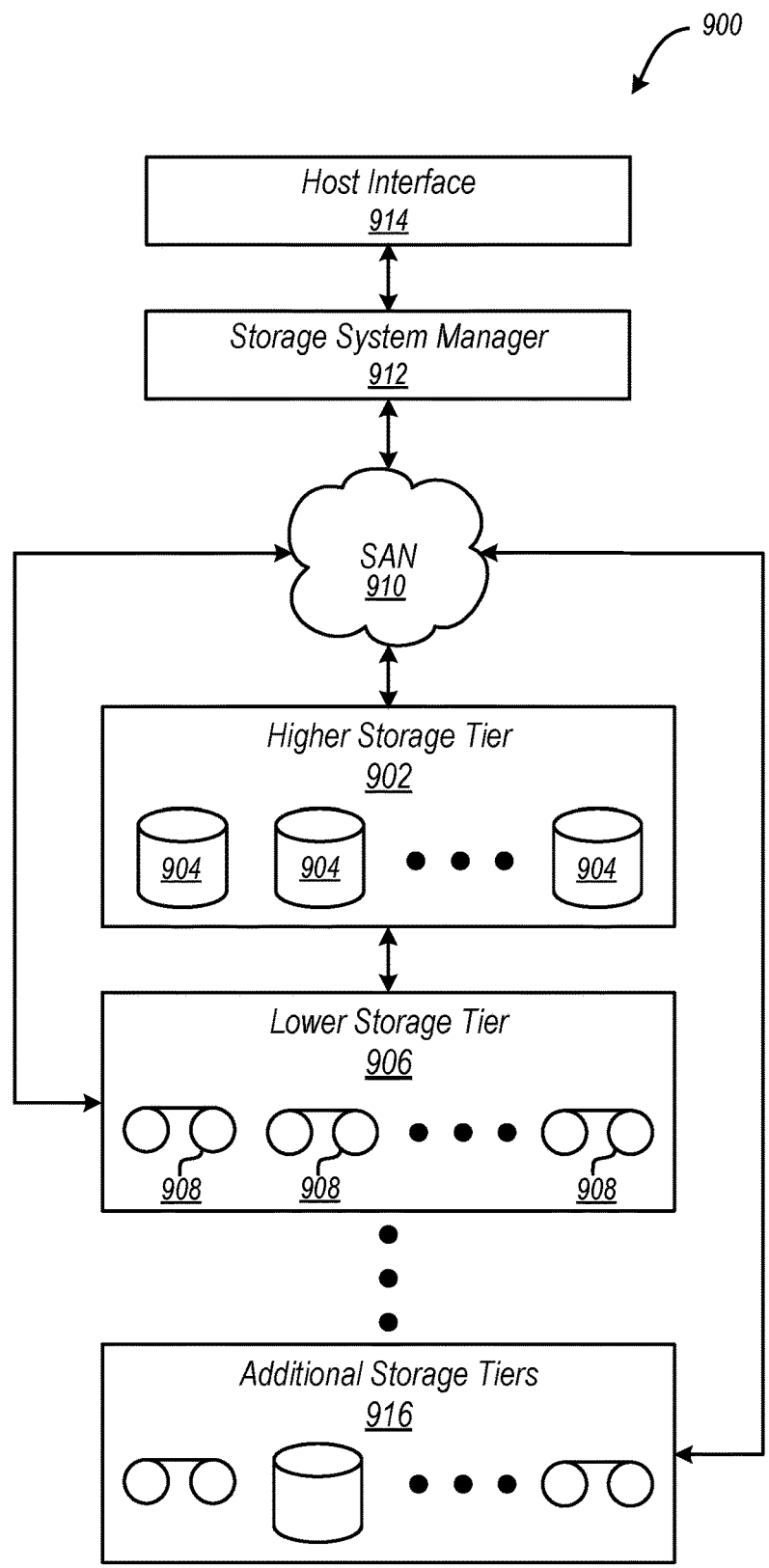
FIG. 9 illustrates a tiered data storage system in accordance with one embodiment.

Now referring to FIG. 9, a storage system 900 is shown according to one embodiment. Note that some of the elements shown in FIG. 9 may be implemented as hardware and/or software, according to various embodiments. In some approaches, the storage system 900 may be implemented in an automated data storage library such as that shown in FIGS. 1-2. In other approaches, an automated data storage library such as that shown in FIGS. 1-2 may be a tier of the storage system 900.

The storage system 900 may include a storage system manager 912 for communicating with a plurality of media on at least one higher storage tier 902 and at least one lower storage tier 906. The higher storage tier(s) 902 preferably may include one or more random access and/or direct access media 904, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 906 may preferably include one or more lower performing storage media 908, including sequential access media such as magnetic tape in tape drives and/or optical media, slower accessing HDDs, slower accessing SSDs, etc., and/or others noted herein or known in the art. One or more additional storage tiers 916 may include any combination of storage memory media as desired by a designer of the system 900. Also, any of the higher storage tiers 902 and/or the lower storage tiers 906 may include some combination of storage devices and/or storage media.

The storage system manager 912 may communicate with the storage media 904, 908 on the higher storage tier(s) 902 and lower storage tier(s) 906 through a network 910, such as a storage area network (SAN), as shown in FIG. 9, or some other suitable network type. The storage system manager 912 may also communicate with one or more host systems (not shown) through a host interface 914, which may or may not be a part of the storage system manager 912. The storage system manager 912 and/or any other component of the storage system 900 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 900 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 902, may include a majority of SSD storage media for storing data in a higher performing storage environment, and remaining storage tiers, including lower storage tier 906 and additional storage tiers 916 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 902, while data not having one of these attributes may be stored to the additional storage tiers 916, including lower storage tier 906. Of course, one of skill in the art, upon reading the present descriptions, may devise many other combinations of storage media types to implement into different storage schemes, according to the embodiments presented herein.

According to some embodiments, the storage system (such as 900) may include logic configured to receive a request to open a data set, logic configured to determine if the requested data set is stored to a lower storage tier 906 of a tiered data storage system 900 in multiple associated portions, logic configured to move each associated portion of the requested data set to a higher storage tier 902 of the tiered data storage system 900, and logic configured to assemble the requested data set on the higher storage tier 902 of the tiered data storage system 900 from the associated portions. Of course, this logic may be implemented as a method on any device and/or system or as a computer program product, according to various embodiments.

With continued reference to the storage libraries described herein, it should be noted that the storage libraries include higher availability storage areas and lower availability storage areas. For example, a higher availability storage cell in a storage library may be accessible by each of a plurality of accessors on a rail system, e.g. dual accessors, etc., of the automated tape library.

Various embodiments with two or more accessors typically may designate e.g. the outermost locations of the storage library, etc., in order to reserve a servicing location for each accessor. These servicing locations may also be used for bulk import/export of tape cartridges into the tape library. If the storage library includes more than one accessor, this servicing location allows the remaining one or more accessors of the rail system access to the remaining storage cells while any one of the accessors is being serviced.

Various embodiments described herein prioritize the assignment of both higher availability and lower availability storage areas of an automated storage library, allowing for a high storage potential in an automated storage library.

Figure 10:
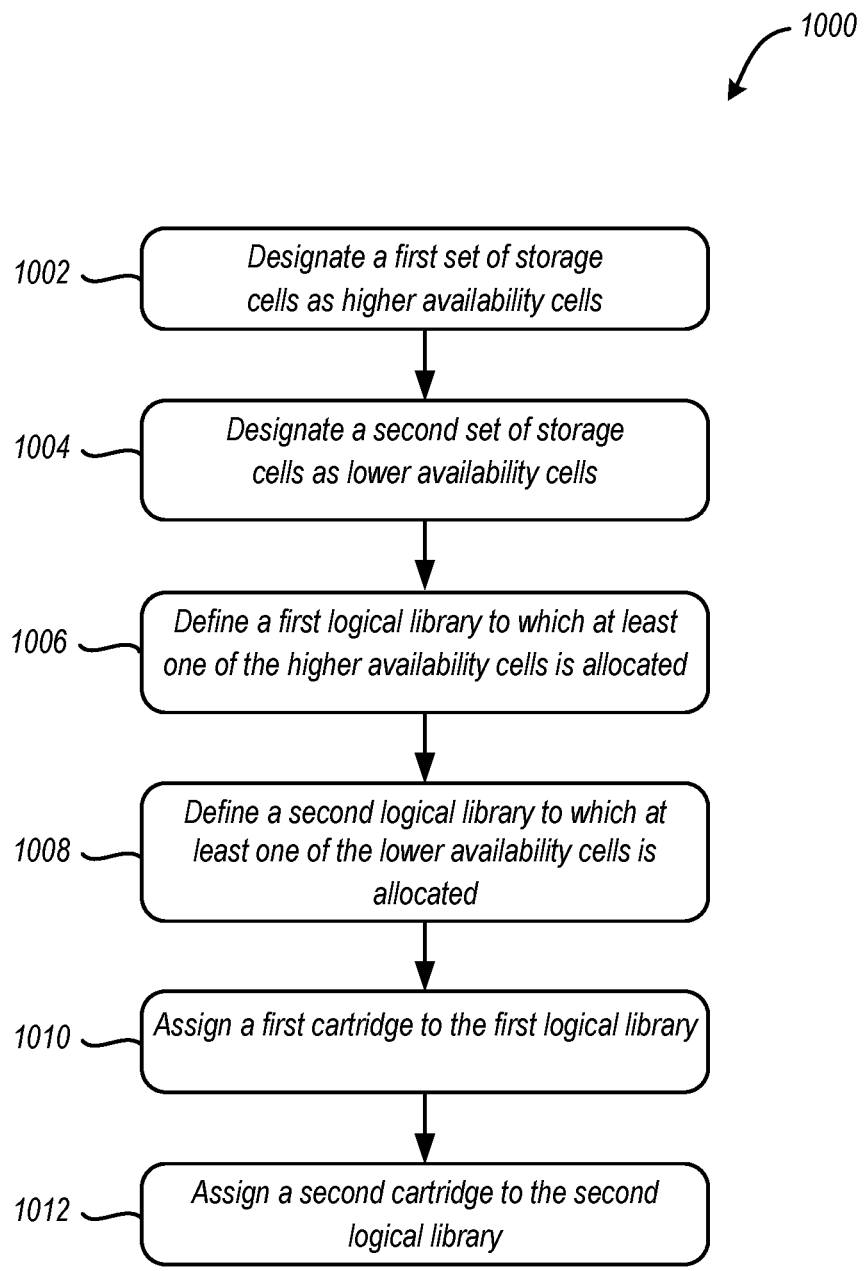
FIG. 10 is a flowchart of a method in accordance with one embodiment.

Now referring to FIG. 10, a flowchart of a method 1000 is shown according to one embodiment. The method 1000 may be performed in accordance with the present invention in any of the environments depicted in FIGS. 1-9, among others, in various embodiments. Of course, more or less operations than those specifically described in FIG. 10 may be included in method 1000, as would be understood by one of skill in the art upon reading the present descriptions.

Each of the steps of the method 1000 may be performed by any suitable component of the operating environment. For example, in various embodiments, the method 1000 may be partially or entirely performed by an automated data storage library as in FIG. 3, a tiered storage system as in FIG. 9, or some other device having one or more controllers therein. The controllers, e.g., processing circuit(s), chip(s), and/or module(s) implemented in hardware and/or software, and preferably having at least one hardware component may be utilized in any device to perform one or more steps of the method 1000. Illustrative controllers include, but are not limited to, a central processing unit (CPU), an application specific integrated circuit (ASIC), a field programmable gate array (FPGA), etc., combinations thereof, or any other suitable computing device known in the art.

The flowchart of method 1000 depicts a method of operationally prioritizing the hierarchy of storage areas of an automated library having a plurality of cells, which are designated as "higher availability cells" and "lower availability cells." The higher availability cells and lower availability cells may include single and/or deep slot cartridge or media storage cells, drives, rewinding stations, and/or other components usable in an automated data storage library. Thus, while much of the present description revolves around storage cells, it should be kept in mind that any other component in the automated data storage library may be designated as higher availability cells and/or lower availability cells using similar techniques and/or based on similar criteria. For example, drives allocated to a lower availability storage area described herein may include a drive and/or drives as illustrated in the service bay frames 13, 14 of FIG. 3.

In operation 1002, a first set of storage cells are designated as higher availability cells. As described above, "higher availability" cells may be those that are accessible e.g. in order to store library cartridges (as will be described below), etc., by each of one or more accessors that serve in the automated tape library. Higher availability cells preferably remain accessible by at least one accessor during the e.g. servicing, downtime, etc. of one or more of the remaining accessors.

In operation 1004, a second set of storage cells are designated as lower availability cells. Lower availability cells may be accessed e.g. in order to store library cartridges (as will be described below), etc., by of one or more, but not all, accessors that serve in automated tape libraries described herein.

Each of the storage cells is configured to receive and store cartridges via one or more accessors. Accessors of the automated tape library may include one accessor, dual accessors, three accessors, etc. depending on the preferred embodiment. According to one embodiment, accessors of the automated tape library may be positioned on a rail system that does not allow accessors to bypass each other. According to another embodiment, accessors of the automated tape library may be positioned on a rail whereby the accessors are able to bypass one another.

It should further be noted that each of the one or more accessors may be assigned a servicing location, e.g., Service Bay Frames 13, 14 of FIG. 3. Each servicing location may correspond to at least some of the lower availability cells e.g. the rightmost set of cells, the leftmost set of cells, etc. The servicing location(s) may be used e.g. for servicing one or more accessors, replacement, etc. Correlating servicing locations with at least some of the lower availability cells prevents spatial losses of a library that would otherwise potentially be lost if no cells for storing data cartridges were permitted in the servicing locations.

In contrast, the higher availability cells may be accessible by all of the accessors, and are preferably not in a servicing location. For example, in a dual accessor automated tape library with five frames, each of the higher availability cells may be assigned to the central three frames, while the remaining two outermost frames would each then be designated as servicing locations for the two accessors, and the lower availability cells would be assigned thereto. Accordingly, the lower availability cells may be accessible by one or more of the accessors at least some times, and/or are completely inaccessible by any accessor at least some times such as when an accessor is being serviced in the service area corresponding to the presently inaccessible cells, and therefore house lower accessibility tape library cartridges.

According to another embodiment, in a dual accessor automated tape library with five frames with accessor passing capabilities, only one of the outermost frames may be assigned as the servicing location for both accessors due to each of the accessors being able to reach the servicing location. Cells in the servicing location may be designated as lower availability cells. Accordingly, the cells in the remaining four frames may then be designated as higher availability cells.

It follows that cartridges expected to be accessed more frequently, cartridges that must be available at all times, or otherwise more accessible than others, may be assigned to the higher availability cells. The ability of an accessor to access the higher availability cells of an automated tape library during the e.g. servicing, downtime, repair, etc. of another accessor is important due to the higher probability that access to a cartridge in a higher availability cell will be requested, and a lower probability that access to a cartridge in a lower availability cell will be requested. Implementing lower availability storage cell(s) in the location(s) that would otherwise be only utilized for accessor servicing is advantageous, especially as consumers continually demand more storage per unit area in data storage deployments, thereby minimizing operating costs. Furthermore, the implementation of lower availability storage cell(s) in the accessor servicing location is advantageous due to the increased overall storage density of the storage library.

It should be noted that the illustrative embodiment described above includes an automated tape library with five frames for exemplary purposes. Automated tape libraries according to various embodiments may include any number of frames, each with a plurality of cells.

With continued reference to FIG. 10, in operation 1006, a first logical library is defined, to which at least one of the higher availability cells may be allocated. The first logical library may map logical locations to the higher availability cells allocated thereto, e.g., using conventional techniques. Referring back to FIG. 3, the host systems 40, 41, 42 may interact with the first logical library to provide commands regarding the higher availability cells, e.g., commands to access the cartridges for reading and/or writing, move the cartridges from a particular storage cell to another storage cell, place the cartridges in a particular storage cell (e.g. first storage cell, second storage cell, etc.), further manage the arrangement of the storage cells, etc. The library controller may manage the correlations between the logical library and the physical locations in the automated storage library.

In operation 1008 of FIG. 10, a second logical library is defined, to which at least one of the lower availability cells may be allocated. The second logical library may be similar to the first logical library, and various systems, components and hosts may interact with each in a similar manner according to one embodiment.

The allocation in this and other embodiments may include dynamic partitioning and/or static partitioning. For static partitioning, physical cells may be pre-allocated to logical libraries, and the physical cells stay allocated until a reconfiguration of the logical library. For dynamic partitioning, storage cells may be pooled and only temporarily allocated to a logical library when a cartridge is being moved to a storage cell.

In operation 1010, a first cartridge is assigned to the first logical library. In accordance with the definition of the first logical library in operation 1006, assigning the first cartridge to the first logical library causes the first cartridge to be placed in at least one of the higher availability cells.

In operation 1012, a second cartridge is assigned to the second logical library. In accordance with the definition of the first logical library in operation 1008, assigning the second cartridge to the second logical library designates the second cartridge as one that can go into one of the lower availability cells. Note that the second cartridge may not be immediately moved to a lower availability cell. Rather, the second cartridge may remain in a higher availability cell until space is needed in the pool of higher availability cells.

The assignment of the cartridges described herein may be based on one or more predefined criterion which may include e.g. previous cartridge access history, a user and/or system designation of the cartridge (e.g. where a user changes a designation of the cartridge from active to archive, where a user changes a designation of the cartridge from archive to active, etc.), a cartridge access event, etc.

The predefined criterion of a cartridge assignment may be indicated by an identifier. In one approach, a range of values may be defined, such as a volume serial number (VolSer) range, where any cartridge having a serial number in the range is assigned to logical library associated with the VolSer range.

According to one embodiment, the user and/or system designation of the cartridge is given a higher weight in determining the assignment than any other criteria. This assignment criteria may be later reassessed/changed for any reason. Furthermore, assignments of the cartridges may be reassigned as will now be described below.

In various embodiments, the first cartridge may be reassigned to the second logical library. Reassigning the first cartridge to the second logical library may cause the first cartridge to be moved to a lower availability cell using the one or more accessors. According to one embodiment, reassigning the first cartridge to the second logical library may be based on some criteria such as e.g. previous cartridge access history, change of a user and/or system designation of the cartridge (such as where a user changes a designation of the cartridge from active to archive, etc.), a cartridge access event, etc.

Similarly, the second cartridge may be reassigned to the first logical library. Reassigning the second cartridge to the first logical library may cause the second cartridge to be moved to a higher availability cell using the one or more accessors. Furthermore according to one embodiment, reassigning the second cartridge to the first logical library may also be based on some criterion such as e.g. previous cartridge access history, change of a user and/or system designation of the cartridge (such as where a user changes a designation of the cartridge from active to archive, etc.), a cartridge access event, etc.

Figure 11:
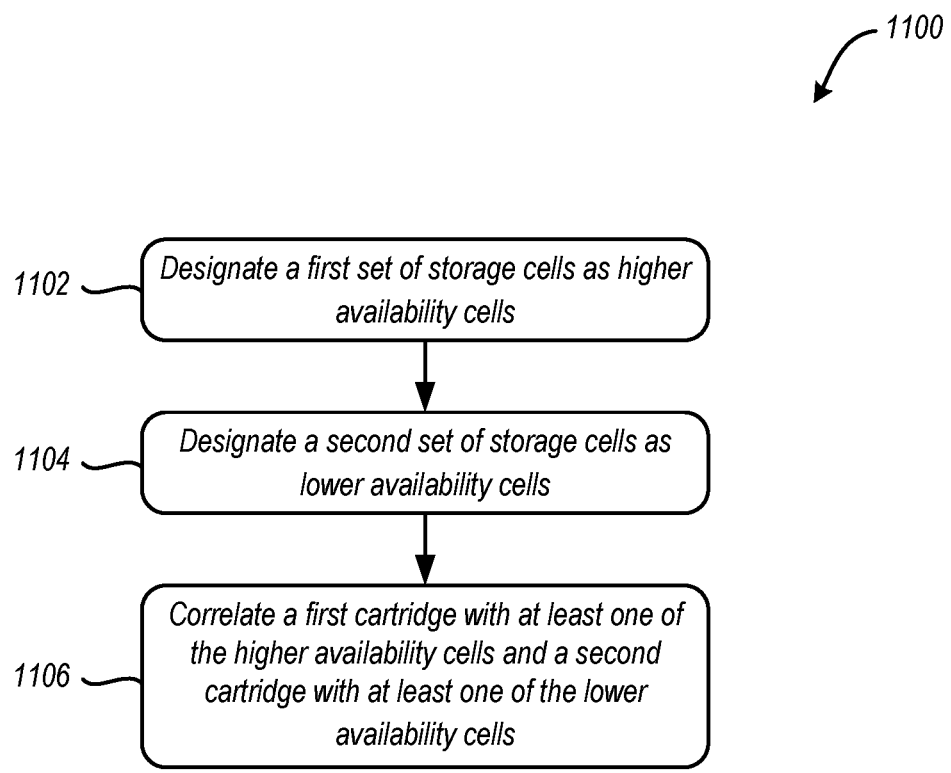
FIG. 11 is a flowchart of a method in accordance with one embodiment.

Now referring to FIG. 11, a flowchart of a method 1100 is shown according to one embodiment. The method 1100 may be performed in accordance with the present invention in any of the environments depicted in FIGS. 1-9, among others, in various embodiments. Of course, more or less operations than those specifically described in FIG. 11 may be included in method 1100, as would be understood by one of skill in the art upon reading the present descriptions.

Each of the steps of the method 1100 may be performed by any suitable component of the operating environment. For example, in various embodiments, the method 1100 may be partially or entirely performed by an automated data storage library as in FIG. 3, a tiered storage system as in FIG. 9, or some other device having one or more controllers therein. The controllers, e.g., processing circuit(s), chip(s), and/or module(s) implemented in hardware and/or software, and preferably having at least one hardware component may be utilized in any device to perform one or more steps of the method 1100. Illustrative controllers include, but are not limited to, a central processing unit (CPU), an application specific integrated circuit (ASIC), a field programmable gate array (FPGA), etc., combinations thereof, or any other suitable computing device known in the art.

The flowchart of method 1100 describes a method of operationally prioritizing the hierarchy of storage areas of an automated library having a plurality of cells.

In operation 1102, a first set of storage cells are designated as higher availability cells. Operation 1102 may be performed in a similar manner as described for operation 1002 of FIG. 10.

In operation 1104 of FIG. 11, a second set of storage cells are designated as lower availability cells. Operation 1104 may be performed in a similar manner as described for operation 1004 of FIG. 11.

As previously noted, each of the one or more accessors is assigned a servicing location corresponding to the lower availability cells. The assignment of a servicing location for the accessors to the lower availability cells prevents spatial losses of a library that would otherwise potentially exist in response to the servicing locations of accessors not also serving as storage cells e.g. lower availability cells.

In operation 1106, the first cartridge is correlated with at least one of the higher availability cells, and the second cartridge is correlated with at least one of the lower availability cells.

Figure 12:
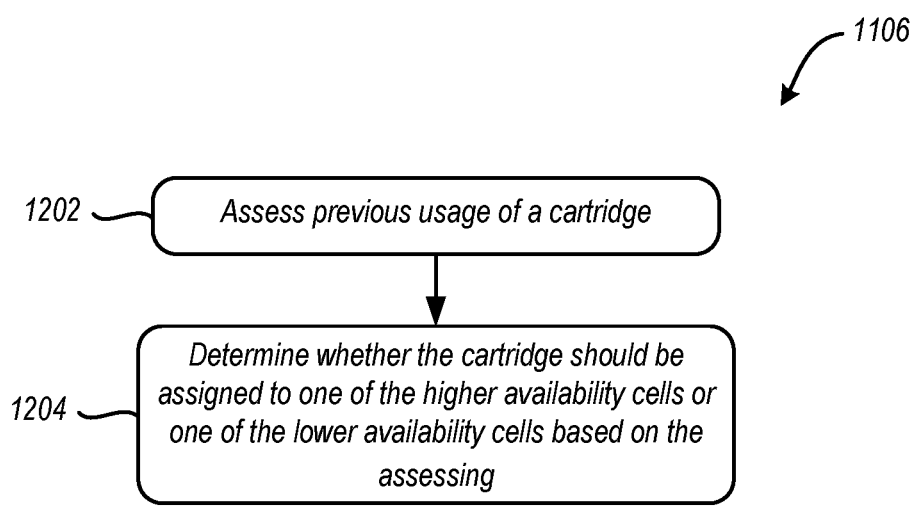
FIG. 12 is a flowchart of a method in accordance with one embodiment.

A nonlimiting example of a correlation of the lower availability cells and the higher availability cells of operation 1106 is shown in FIG. 12. In operation 1202 of FIG. 12, the previous usage of a cartridge is assessed. Previous usage of a cartridge e.g. in a time domain, in a frequency domain, in a degree of importance domain, etc., may be used in order to determine the degree of availability of a cartridge so that e.g. the cartridge may be placed in a corresponding availability storage cell, the automated storage library may maintain accessibility requirements for optimal functionality, the automated storage library may operate with a preferred prioritization, etc. For example, a least recently used (LRU) cartridge indicator may be used in an algorithm to determine that a particular cartridge should be moved from a higher availability cell to a lower availability cell, and vice versa.

In operation 1204, it is determined whether the cartridge should be assigned to one of the higher availability cells or one of the lower availability cells based on the assessing (e.g. the assessing of operation 1202). For example, the cartridge is preferably assigned to a higher availability cell in response to determining that the cartridge should be placed in a higher availability cell. Likewise, the cartridge is preferably assigned to a lower availability cell in response to determining that the cartridge should be placed in a lower availability cell.

In one example, in a storage library using deep storage slots, e.g., as shown in FIGS. 7A and 7B, the library management system (e.g., library firmware) is allowed to control the placement of cartridges in the slots, and/or between the higher and lower availability cells, based on cartridge usage. Known algorithms may be used to migrate cartridges from more accessible tier 0 or tier 1 slots to deeper tier slots based on cartridge usage. These algorithms are sometimes called LRU (least recently used) algorithms. The higher availability cells may maintain similar concepts as used in current library systems. However, the lower availability slots may be used as deeper tier of storage than the deep slots in the higher availability regions of the library. For example, the storage slots in the higher availability cells may each have multiple tiers, e.g., tier 0, 1, 2, 3, 4, and 5 based on positions in the deep storage slots, while the lower availability slots could be assigned tiers 6, 7, 8, 9, and 10 (this example assumes deep slots each with 5 cartridge depth capacities). Over time, using the LRU algorithms, the oldest (least recently used) data may migrate through the tier progressions and eventually move from storage slots in higher availability cells to storage slots in lower availability cells.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

A data processing system suitable for storing and/or executing program code may include at least one processor, which may be or be part of a controller, coupled directly or indirectly to memory elements through a system bus, such as processor 400 of FIG. 4. The memory elements can include local memory employed during actual execution of the program code, such as nonvolatile memory 404 of FIG. 4, bulk storage, and cache memories which provide temporary storage of at least some program code in order to reduce the number of times code must be retrieved from bulk storage during execution.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer-implemented method, comprising:
designating a first set of drives as higher availability drives;
designating a second set of drives as lower availability drives;
wherein each of the drives is configured to receive and store cartridges via one or more accessors,
wherein each of the one or more accessors is assigned a servicing location corresponding to the lower availability drives; and
correlating a first cartridge with at least one of the higher availability drives and a second cartridge with at least one of the lower availability drives.

2. The computer-implemented method of claim 1, comprising:
reassigning the first cartridge to the lower availability drives; and
causing the first cartridge to be moved to a lower availability drive using the one or more accessors.

3. The computer-implemented method of claim 1, comprising:
reassigning the second cartridge to the higher availability drives; and
causing the second cartridge to be moved to a higher availability drive using the one or more accessors.

4. The computer-implemented method of claim 1, wherein the higher availability drives are accessible by each of the one or more accessors.

5. The computer-implemented method of claim 1, wherein the lower availability drives are inaccessible by one or more of the accessors at least some times, and are completely inaccessible by any accessor at least some times.

6. The computer-implemented method of claim 1, wherein the assignment of the cartridges is based on at least one predefined criterion selected from a group consisting of: previous cartridge access history, a user and/or system designation of the cartridge, and a cartridge access event.

7. The computer-implemented method of claim 6, wherein the user and/or system designation of the cartridge is given a higher weight in determining the assignment than any other criteria.

8. The computer-implemented method of claim 1, wherein the correlating includes:
assessing previous usage of a cartridge; and
determining whether the cartridge should be assigned to one of the higher availability drives or one of the lower availability drives based on the assessing.

9. A system, comprising:
a processor and logic integrated with and/or executable by the processor, the logic being configured to perform the computer-implemented method of claim 1.

10. A computer program product comprising a non-transitory computer readable storage medium having program instructions embodied therewith, wherein the computer readable storage medium is not a transitory signal per se, the program instructions executable by a controller to cause the controller to:
designate, by the controller, a first set of drives as higher availability drives;
designate, by the controller, a second set of drives as lower availability drives;
wherein each of the drives is configured to receive and store cartridges via one or more accessors,
wherein each of the one or more accessors is assigned a servicing location corresponding to at least some of the lower availability drives; and
correlate, by the controller, a first cartridge with at least one of the higher availability drives and a second cartridge with at least one of the lower availability drives using at least one of a first procedure and a second procedure.

11. The computer program product of claim 10, wherein the first procedure includes:
assigning the first cartridge to a first logical library to which at least one of the higher availability drives is allocated; and
assigning the second cartridge to a second logical library to which at least one of the lower availability drives is allocated,
wherein the second procedure includes:
assessing previous usage of each cartridge; and
determining whether the cartridge should be assigned to one of the higher availability drives or one of the lower availability drives based on the assessing.

12. The computer program product of claim 10, wherein the program instructions are executable by the controller to cause the controller to:
reassign, by the controller, the first cartridge to the lower availability drives; and
cause, by the controller, the first cartridge to be moved to the lower availability drive using the one or more accessors.

13. The computer program product of claim 10, wherein the assignment of the cartridges is based on at least one predefined criterion selected from a group consisting of: previous cartridge access history, a user and/or system designation of the cartridge, and a cartridge access event.

14. A computer-implemented method, comprising:
designating a first set of drives as higher availability drives;
designating a second set of drives as lower availability drives;
defining a first logical library to which at least one of the higher availability drives is allocated;
defining a second logical library to which at least one of the lower availability drives is allocated;
assigning a first cartridge to the first logical library; and
assigning a second cartridge to the second logical library.

15. The computer-implemented method of claim 14, comprising:
reassigning the first cartridge to the second logical library,
wherein each of the drives is configured to receive and store one or more cartridges via one or more accessors,
wherein each of the one or more accessors is assigned a servicing location corresponding to at least some of the lower availability drives; and
causing the first cartridge to be moved to a lower availability drive using the one or more accessors.

16. The computer-implemented method of claim 15, comprising:
reassigning the second cartridge to the first logical library; and
causing the second cartridge to be moved to a higher availability drive using the one or more accessors.

17. The computer-implemented method of claim 15, wherein the higher availability drives are accessible by each of the one or more accessors.

18. The computer-implemented method of claim 15, wherein the lower availability drives are inaccessible by one or more of the accessors at least some times, and are completely inaccessible by any accessor at least some times.

19. The computer-implemented method of claim 14, wherein the assignment of the cartridges is based on at least one predefined criterion selected from a group consisting of: previous cartridge access history, a user and/or system designation of the cartridge, and a cartridge access event.

20. The computer-implemented method of claim 19, wherein the user and/or system designation of the cartridge is given a higher weight in determining the assignment than any other criteria.

* * * * *